Figure 1:
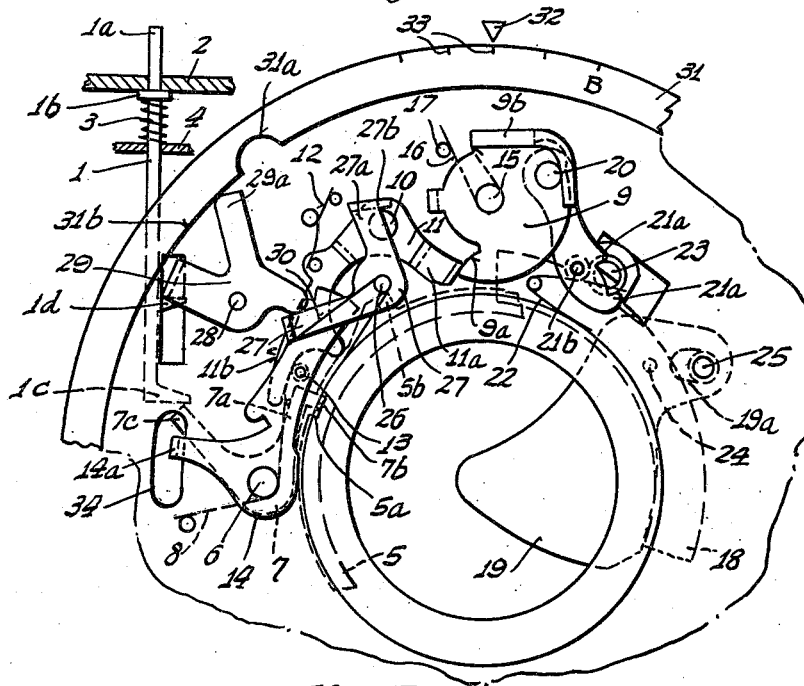

Oct. 1, 1963      E. WELLER      3,105,429
PHOTOGRAPHIC CAMERA
Filed Aug. 10, 1960

INVENTOR.
Erwin Weller
BY
March, Gillette, Virgil & Eslinger
ATTORNEYS

United States Patent Office 3,105,429
Patented Oct. 1, 1963

3,105,429
PHOTOGRAPHIC CAMERA
Erwin Weller, Calmbach (Enz), Germany, assignor to Alfred Gauthier, G.m.b.H., Calmbach (Enz), Germany, a corporation of Germany
Filed Aug. 10, 1960, Ser. No. 48,756
Claims priority, application Germany Aug. 22, 1959
2 Claims. (Cl. 95—63)

This invention relates to photographic cameras having B-exposure devices, and more particularly to cameras of this type wherein the shutter release mechanism includes a control member which is moved for the purpose of releasing the camera shutter, said control member being itself released or actuated by means of the manually-operable camera release member.

Control members of this type are utilized in cameras for the purpose of effecting, prior to the start of opening of the camera shutter, additional exposure-affecting settings or operations, as for example the shifting of a viewing mirror in a reflux camera from its setting or viewing position to the exposure position, and/or effecting operation of automatic setting means dealing with exposure factors such as the diaphragm aperture, etc. By the use of such control member it is possible to obtain, in a simple and reliable manner, an accurate adjustment and functioning of these various devices, including the viewing mirror and automatic diaphragm setting mechanism, especially with relation to the release and opening of the camera shutter.

Because of the advantages attendant the use of this control member such member has also been utilized for controlling or actuating the device which effects the B-exposures in a camera. However, in accomplishing this added function it has been necessary in the past to employ mechanisms and parts which are of complicated shape and construction, and which involve an appreciable expenditure or cost.

The above drawbacks and disadvantages of prior cameras utilizing a control member of the type outlined for the purpose of effecting B-exposures are obviated by the present invention, and one object of the invention is to provide a novel and improved camera construction utilizing a control member of the kind specified, wherein the device or mechanism by which B-exposures are effected, is especially simple and requires substantially no appreciably greater cost than is had with cameras not provided with such control member, wherein the release of the camera shutter is effected directly by the camera release member.

In accomplishing this object there is provided, in accordance with the invention, a novel organization including a locking member of the B-exposure device, which is adapted to retain or hold the camera shutter in its open position, said locking member being made responsive to the releasing movement of the camera release member whereby it is shifted into a locking position, and said member being returned to its starting position with the return movement of the camera release member. The arrangement also is characterized by a setting member which has a "B" position and at least one other setting position, such setting member when in its said other position restraining the locking member from movement to its locking or shutter retaining position, and when in its "B" position freeing the locking member to enable it to be shifted to locking position upon actuation of the camera release member.

A surprisingly advantageous feature of such a camera as provided in accordance with the invention resides in the fact that the camera release member serves directly to operate the device provided for effecting "B"-exposures. This results in an especially simple and economical construction of the B-exposure device on the one hand, whereas on the other hand it obviates the necessity for associating any additional control or function with the above-mentioned control member, thus enabling special control and adjusting operations as required in known prior devices to be dispensed with.

A particularly uncomplicated and expenditure-saving cooperable relationship between the said locking and setting members is obtainable by providing a clearance notch or recess together with a blocking or movement-obstructing portion connected with the setting member the said recess, for the "B" position of the setting member, providing clearance to enable freedom of movement of the locking member to be had whereupon the latter may be shifted to its locking position in response to actuation of the camera release member. When the setting member is in another position the blocking portion or movement-restraining portion prevents movement of the locking member into locking position, and accordingly such member is not operable to halt the shutter blades in their open positions.

The accompanying drawings illustrate an embodiment of the invention, showing a camera having an intra lens shutter.

In the drawings:

FIG. 1 is a fragmentary diagrammatic front elevational view showing a portion of a photographic intra-lens shutter construction with the front cover plate removed, there being arranged therein a B-exposure device which is cooperable with the camera release member, as provided by the invention. All those members of the shutter construction and of the camera which are not essential for an understanding of the invention have been omitted for the sake of clarity of illustration. The shutter is shown in its cocked position, in readiness for effecting an exposure, with the exposure time being automatically controlled by virtue of the setting member not being in the "B" position.

Figure 2:
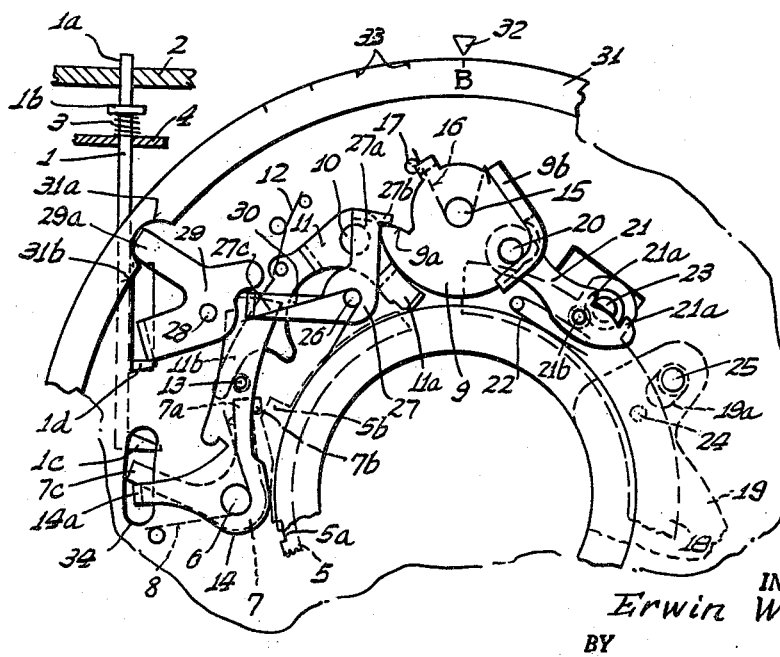

FIG. 2 is a view similar to that of FIG. 1 but showing the setting member in its "B" position. The shutter is shown as having been released in response to actuation of the camera release member, which is illustrated in depressed position. The shutter blades are fully opened, for effecting a bulb exposure.

Referring to the figures, the camera release which is indicated by the numeral 1 comprises a plunger or pin having a handle portion 1a which extends through the upper wall 2 of a camera housing (not fully shown for reasons of clarity of illustration), the arrangement being such that the release member 1 is vertically movable and may be depressed against the action of a compression coil spring 3. The spring 3 is disposed between a collar 1b provided on the release member 1 and a stationary plate 4 disposed within the camera housing. The camera release 1 serves, in a well-known manner, to release a known control member or ring 5 which runs down in a counterclockwise direction under the action of a suitable driving mechanism (not shown), said ring after having traveled through a predetermined arcuate or angular path, effecting the release of the camera shutter in a manner to be explained below.

In the illustrated embodiment of the invention the shutter construction is of the intra-lens type. The control ring 5 further serves, in a well-known manner, to release or activate mechanisms which are to function prior to opening of the shutter blades. Such devices or mechanisms may, for example, comprise a means which automatically shifts the viewing mirror of a reflex camera from the setting or viewing position to the exposure position, and may further comprise a means for automatically setting the camera diaphragm to a preset opening or aperture value. Such known devices, as well as their connections with the control ring 5 are not shown in the illustrated embodiment of the invention since they form no part per se of the present inventive concept.

For controlling the ring 5 there is provided a pivotally mounted blocking or arresting lever 7 which is positioned in the shutter housing. The lever 7 serves to retain the control ring 5 in a cocked position as shown in FIG. 1 against the action of a suitable driving device which influences the control ring and may be set or cocked, for example, in response to actuation of the film transport means. One arm 7a of the lever 7 has a projection 7b which is receivable in a recess or notch 5a provided in the control ring 5, the lever 7 being biased in a clockwise direction for this purpose by a spring 8 which extends about the axis or pin 6 of the lever. The other arm 7c of the lever 7, on the other hand, is disposed in the path of movement of a bent portion or lug 1c provided on the release member 1, whereby upon the latter being depressed it will swing the lever 7 counterlockwise against the action of its return spring 8 and will shift the lug 7b of the lever out of the recess 5a of the control ring 5.

For the purpose of releasing the shutter, the control ring 5 has a projection 5b by means of which it actuates, during its running-down movement, a locking device for a well-known main driving disk 9, to release the latter. The locking device comprises an arresting lever 11 which is pivotally mounted about an axis 10 provided in the shutter housing, one arm 11a of the lever cooperating with a projection 9a provided on the driving disk 9 for the purpose of retaining the disk in its set or cocked position as shown in FIG. 1. The other arm 11b of the lever 11 engages under the action of a spring 12, a pin 13 which is carried by a lever 14 pivotally movable about the axis 6 in the shutter housing. The arresting lever 7 which influences the control ring 5 also serves to actuate the lever 14. Involved in this action is the cooperation of the lever 7 with the recess 5a of the control ring 5 by which the ring is released in response to counterclockwise turning of the lever. Also, the lever 7 has an arm 7c which is engageable with a tab or lug 14a provided on the lever 14. As seen in FIGS. 1 and 2, the lug 14a passes through a slot 34 provided in the rear of the shutter housing, so as to be disposed in the path of movement of the arm 7c of the lever 7. It will be noted that upon release of the control ring 5 and counterclockwise turning of such ring, the projection 5b thereof will engage the lever 7 as seen in FIG. 2, shifting it counterclockwise, and this latter in turn will now engage and drive ahead of it the lever 14, effecting a like counterclockwise turning of this latter lever. Such counterclockwise movement of the lever 14 causes the pin 13 thereof to swing the arresting lever 11 clockwise, thereby to remove the arm 11a from engagement with the projection 9a of the driving disk 9 for the shutter. Accordingly, this action releases the driving disk for the purpose of effecting opening and closing of the shutter blades 19.

The driving disk 9 is pivotally movable about an axis 15 disposed in the shutter housing, and is powered by a driving spring 16. The spring 16 at one end engages a stationary pin 17 whereas at its other end it engages a lug 9b provided on the driving disk 9 for the purpose of powering the latter. The setting or cocking of the driving disk 9 is effected in a well-known manner, in response to operation of a film transport means.

For the purpose of actuating a driving ring 18 provided in conjunction with the shutter blades 19, a driving link 21 is pivotally mounted in a well-known manner about an axis 20 provided on the driving disk 9. The link 21 has jaws 21a which are engageable with opposite sides of a pin 23 fixedly mounted on the shutter blade driving ring 18. The link 21 is maintained in engagement with the pin 23 by means of a spring 22, which is engageable with a pin 21b provided on the link. By virtue of clockwise running-down movement of the driving disk 9, the link 21 imparts a reciprocating movement to the shutter blade driving ring 18 in the well-known manner, and by such movement the shutter blades 19 are first opened and, upon having reached a fully-open position, are again closed. The shutter blades (only one of which is shown in the drawings for reasons of clarity of illustration) are positioned on the driving ring 18 about pins 24 and in addition have slots 19a which receive stationary pins 25 to further effect control of the shutter blades.

In order to be able to effect, in a shutter of the above-described kind, not only photographs wherein the exposure times are automatically controlled but also B-exposures, all in a simple and economical manner, there is provided by the invention a "B" exposure mechanism having a locking member which serves to retain the camera shutter in its open position, and which is shiftable into a locking, operative position in response to the actuation of the camera release member 1. The said locking member of the "B" exposure device returns to its non-locking or inoperative position starting with the return movement of the camera release member, this being preferably effected by such member during its return movement. In addition, the invention provides a novel organization comprising a setting member which may be placed in a "B" position and also in at least one other setting position, the said member when in the "B" position releasing the locking member of the B-exposure mechanism for movement into its locking, operative position. For any other setting position of the setting member the said locking member is retained in an inoperative position and prevented from being shifted out of the same.

The locking member of the B-device is, in the present illustrated embodiment of the invention, a two-armed lever 27 which is pivotally movable about an axis 26 provided in the shutter. One arm 27a of the lever 27 has a lug or tab 27b which is adapted to cooperate with the projection 9a of the shutter driving disk 9 for the purpose of retaining the driving disk in an intermediate position after it had been initially released, said intermediate position corresponding to the open positions of the shutter blades 19 all as shown in FIG. 2. The remaining arm 27c of the lever 27 may be tensionally or positively connected to the camera release 1. Such connection is established by a lever 29 which is pivotally movable about an axis 28 provided in the shutter housing and which, under the action of a spring 30 biasing the lever 27 clockwise, cooperates with an arm 1d provided on the camera release member 1. The cooperable relationship of the levers 27, 29 and of the release member 1 are clearly apparent in the figures.

The setting member which serves to selectively connect and disconnect the device for effecting "B" exposures is given the reference numeral 31, said member being preferably in the form of a ring.

The setting member 31 has a number of different settings, one of which is designated by a letter "B." The other settings of the ring 31 are identified by marks 33, these settings being associated with "instantaneous" exposure times. A stationary or index mark 32 serves as a reference point for the indicia mentioned above, which are carried by the setting ring 31.

When the setting ring 31 is in its "B" position, the arresting lever 27 is able to be operative, being shifted in response to actuation of the camera release member 1, all in the manner illustrated in FIG. 2. If the ring 31 is set at any of the marks 33 which, as already mentioned, are associated with "instantaneous" exposure times which are automatically controlled by the shutter, the ring 31 by virtue of a control portion 31b, will retain the lever 29 and hence the arresting lever 27 in the inoperative positions shown in FIG. 1 during actuation of the camera release member 1. Accordingly, for such positions, the driving disk 9 will not be halted or retained in the intermediate position illustrated in FIG. 2, corresponding to the fully-open positions of the shutter blades 19.

The above mode of operation is accomplished, in the illustrated embodiment of the invention, in an especially simple, easily understandable manner, and by the use of relatively few components, by virtue of the fact that for the "B" setting position of the setting ring 31 a clearance notch or recess 31a is arranged to be opposite an arm 29a of the lever 29 which is connected operably with the arresting lever 27. The arm 29a of the lever 29 is shiftable, under the action of a spring 30 acting on the lever 27 and biasing the same clockwise whereby a counterclockwise bias is imparted to the lever 29, into the clearance recess 31a during the releasing actuation of the camera release member 1, thereby to effect a shifting of the lever 27 to its operative, disk retaining position. If, on the other hand, the setting ring 31 is set at any one of the marks 33, the arm 29a of the lever 29 will be adjacent and engaged with the control portion 31b constituting the inner circumferential surface of the ring 31. By such engagement the lever 29 will be held against counterclockwise movement and hence the locking lever 27 will not be shifted clockwise into its operative locking position during the release operation of the camera release member 1. It will be understood that the lever 27 is normally urged into its operative locking position by the spring 30 which imparts a clockwise bias to the lever 27 and in turn a counterclockwise bias to the lever 29, tending to maintain the arm 29a thereof in engagement with the control surface 31b of the setting ring 31.

In the illustrated embodiment of the invention the shutter construction is of the intra-lens type. However, the invention is not limited to this particular kind of shutter but instead is applicable to any type of camera of the initially described species, since the direct cooperation of the camera release and the B-exposure device always brings about the above-mentioned advantages, which are apparent from the illustrated embodiment described above. Such advantages involve the simplicity and economy of the structure and of the mode of operation of the B-exposure device. Of special importance is the fact that neither the control ring 5 which serves to release the camera shutter, nor the shutter release itself are called upon to fulfill a task involving the carrying out of "B" exposures. Thus, it is possible to develop and construct the shutter release mechanism so that it is completely freely movable without having to make allowance for the special requirements involved in effecting "B" exposures.

I claim:
1. In a photographic camera arranged to effect B exposures and having a movable control member for releasing the camera shutter, said control member being itself released by means of a manually operable camera release member, in combination, a B exposure device comprising a locking member movable between locking and unlocking positions and comprising means operable when the locking member is in its locking position, for halting the camera shutter in the open position; means including an intermediary lever separate from said locking member and from the camera release member and responsive to releasing movement of the camera release member, for effecting a shifting of said locking member to its locking position, said means returning said locking member to unlocking position in response to return movement of the camera release member; a setting member movable between B position and at least one other position; means disposed in cooperating relationship with said intermediary lever and rendered operative in response to movement of said setting member to said other position for retaining said locking member in its unlocking position, and means cooperatively associated with said intermediary lever and rendered operative in response to the movement of said setting member to said B position for retaining said locking member in its locking position upon the shifting of said locking member by the camera release member.

2. A camera as in claim 1 in which the means retaining the locking member comprises a control portion provided on the setting member, said setting member also having a clearance recess, and in which the intermediary lever comprises a part connected with the locking member and cooperable with said control portion and recess, the positioning of the setting member respectively in the "B" and said "other" positions presenting either said control portion or said recess to the said part to either block movement of the part or else provide clearance therefor whereby the actuation of the camera release will respectively either not shift or else shift the said part and locking member.

References Cited in the file of this patent
UNITED STATES PATENTS
2,953,075    Barth _____ Sept. 20, 1960